Dec. 4, 1951     B. G. GELLENBECK     2,577,459
CHILD'S CONVERTIBLE VEHICLE
Filed Feb. 24, 1948     2 SHEETS—SHEET 1
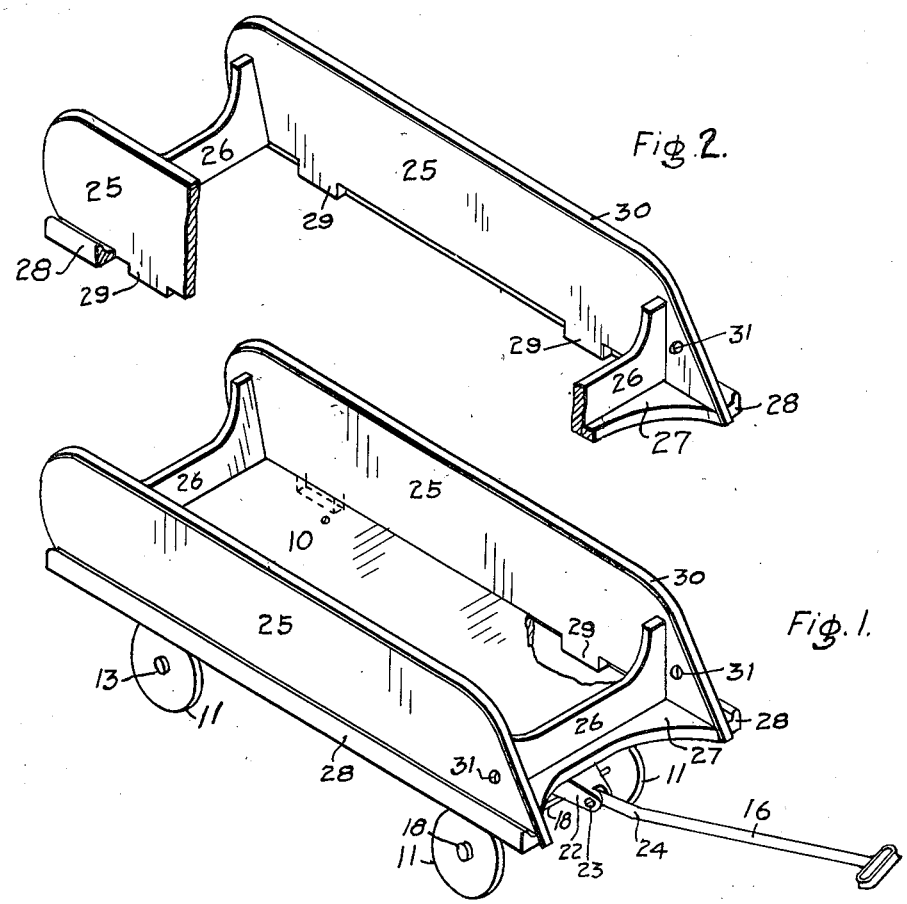
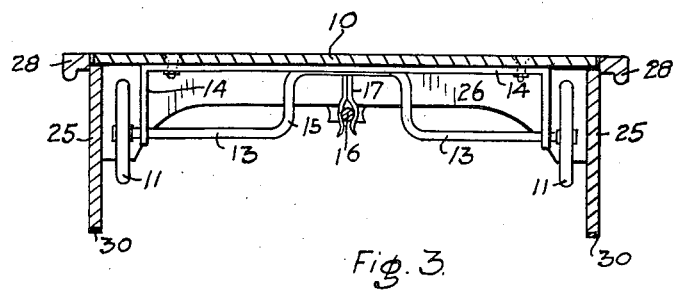
Benjamin G. Gellenbeck
INVENTOR
BY
ATTORNEY

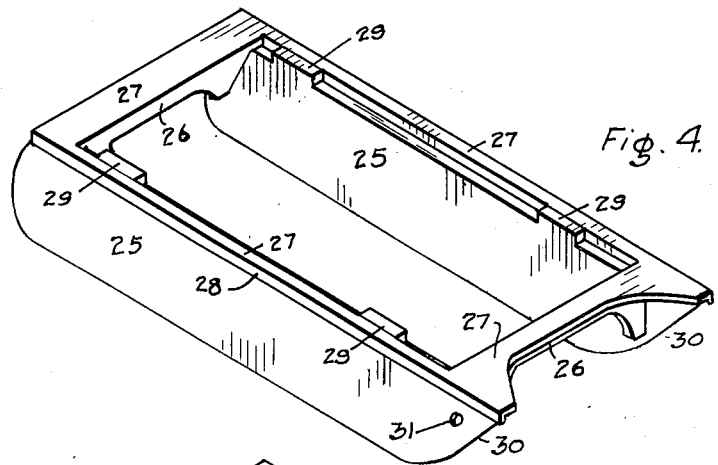
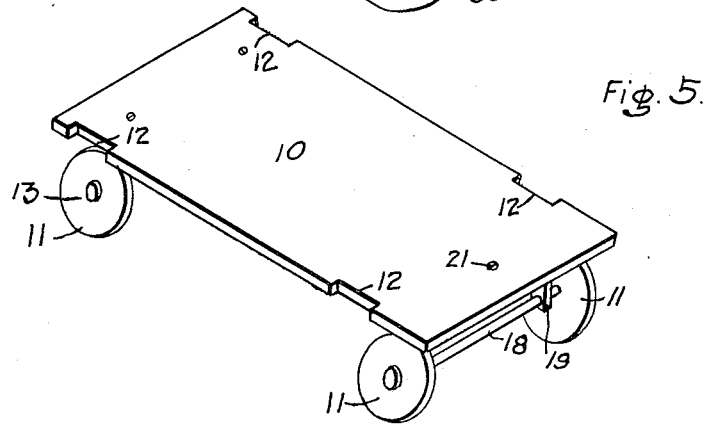
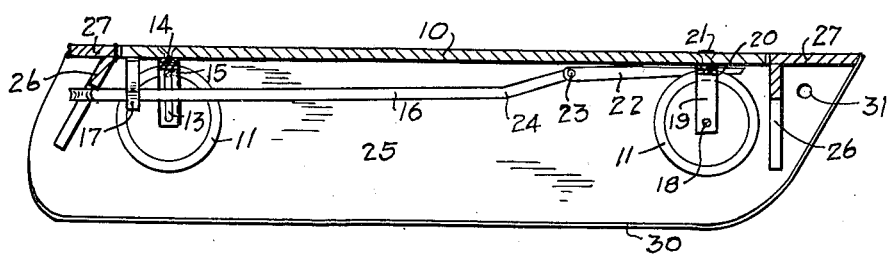
Benjamin G. Gellenbeck
INVENTOR

Patented Dec. 4, 1951

2,577,459

UNITED STATES PATENT OFFICE 2,577,459

CHILD'S CONVERTIBLE VEHICLE

Benjamin G. Gellenbeck, Tacoma, Wash.

Application February 24, 1948, Serial No. 10,497

4 Claims. (Cl. 280—8)

1

This invention relates to child's vehicles and comprises a vehicle which is convertible into either a scooter, a wagon, or a sled, and has for its object to combine them into a single structure composed of two elements whereby the same vehicle may be used as a wheeled vehicle when no snow is available, or as a sled.

In certain sections of the country the fall of snow is either so rare or of such a temporary character that sleds are not practical and therefore the children are deprived of the thrill of coasting when a fall of snow does occur, since their wheeled vehicles do not lend themselves to playing in the snow. It is to supply this need that I have devised the following described vehicle which may be changed from a wheeled vehicle into a sled as may be desired by the child.

The objects of this invention are to provide such a structure wherein the relative positions of the two elements thereof may be inverted and thereby change the character of the vehicle, and whereby this change may be made without having to operate any screws or bolts and yet which will be perfectly secure in either of its two positions; to provide such a simple structure that the child himself may do the converting without help; to provide means for holding the handle in stowed position if desired; and to provide a vehicle which will be readily made and which is of a durable character.

I attain these and other objects as may be clear to those making, owning or using the vehicle by the devices and arrangements illustrated in the accompanying drawings, in which—

Fig. 1 is a perspective view of the vehicle used as a wagon; Fig. 2 is a coordinated view of the second element forming the sides of the wagon, removed therefrom and partly broken away to reveal its construction; Fig. 3 is a cross-section of the vehicle when used as a sled; Fig. 4 is a perspective view of the second element, when inverted; Fig. 5 is a similar view of the first element forming the wheeled vehicle, with its tongue or handle turned under and ready to be inserted in the second element shown in Fig. 4, to form a sled; and Fig. 6 is a longitudinal section of the vehicle when used as a sled.

Identical numerals of reference refer to the same parts throughout the several views.

As seen in Figs. 1 and 5 the element forming the wheeled vehicle comprises a platform 10 mounted on wheels 11 and having its side edges notched at 12 in four places, the notches 12 on one side of the platform 10 corresponding with those of the other side. The rear wheels 11 are

2 mounted on a fixed axle 13 secured to the platform 10 by a metal frame 14 (Fig. 3). The central part of the axle 13 is bent upward at 15 to make room for the hereinafter described tongue or handle 16 when in its stowed position. A double spring clip 17 is secured to the under side of the platform 10 to receive and hold the said handle 16 when thus stowed.

The front wheels 11 are mounted on the front axle 18 which is journaled in the legs 19 of a frame 20 (Fig. 6), which is pivoted at 21 to the under side of the platform 10 and which has an extension 22 to which the tongue or handle 16 is secured by a horizontal pivot 23. The handle 16 may be curved or slightly bent as at 24.

This wheeled vehicle, above described, may be used alone as a scooter, being steered by the handle 16 turning the frame 20 on its pivot 21. It may also be used as a wagon by the addition thereto of the following described second element, as shown in Figs. 1 and 2.

This element comprises two parallel side walls 25, secured together by cross braces 26 and by a horizontal member 27. The central part of this member 27 is cut out so that the above-described platform 10 of the first element fits neatly therein. The opening thus made in the member 27 extends outside of the walls 25 and is provided with a grooved hand rail 28 along its side edges to provide a suitable hand hold when the vehicle is used as a sled. The top edges of the side walls 25 form shoulders in the opening, on which the edges of the platform 10 rest (Fig. 3).

The side walls 25 are provided with four downward extending lips or tenons 29 which fit snugly in the notches 12 in the sides of the platform 10. The depth of the tenons 29 is equal to the thickness of the platform 10, the horizontal member 27 and the hand rails 28 so that all their contiguous surfaces are coplanar and so that when the apparatus above described is inverted to extend below the platform 10 (Figs. 3, 6) as hereinafter described, they together form a continuous horizontal surface.

The second element of my improved child's vehicle comprising mainly the sides 25 may be removed from the wagon as above described, and reversed, then the handle 16 may be turned rearward on the pivot 21 under the platform 10 and slipped into the holding clip 17 which thus retains it in place in such reversed position. The wheeled structure may then be lifted and inserted downward in the opening in the horizontal member 27, thus bringing the wheels 11 inside of the walls 25 (Fig. 3). The said walls 25 extend downward below the wheels 11 so as to provide sufficient clearance thereunder when the vehicle is used as a sled. The front ends of the side walls 25 are inclined to form the accepted shape of sled runners. A suitable metal strip 30 is secured to the exposed edges of the runners 25 to form the usual sled runners. Holes 31 are provided to receive the usual sled rope.

Thus it will be seen that my convertible child's vehicle provides a choice of three vehicles in one structure. When used as a scooter, the other element is laid aside and the handle 16 is released from the clip 17 and turned on its pivot 21 to the position shown in Fig. 1 and then swung backward on the pivot 23 to steer the scooter. If it is desired to use it as a wagon, the second element is placed over the scooter platform, the walls 25 extending upward therefrom, the tenons or lugs 29 fitting in the notches 12 on the scooter edges, as in Fig. 1. If the vehicle is to be used as a sled the second element is removed from the scooter and inverted, then the scooter is inserted in the opening in the said second element and is held in suspended position by its edges resting on the shoulders formed by the upper edges of the runners 25, the lugs or tenons 29 entering the notches 12 in the reversed order than when used as a wagon.

It is, of course, understood that many changes may be made in the details of construction without departing from the spirit of my invention as outlined in the appended claims.

Having described my invention, what I claim and desire to secure by Letters Patent, is:

1. In a convertible vehicle, the combination of a wheeled platform and a removable frame member comprising a complete structure of side walls and cross braces and adapted to be removably secured to said wheeled platform in either of two inverted positions, and extending above the wheeled platform in one position and below said platform in the other position, said removable frame member being wider than said wheeled platform, and said side walls being deeper than said wheeled platform, whereby they form enclosing sled runners.

2. In a convertible vehicle, the combination of a member having a flat top, cross braces, and vertical side walls, said flat top having an opening therein, said side walls forming shoulders in said opening; and a wheeled platform removably secured and fitting in said opening and supported by said shoulders and adapted to lie in either of two relatively inverted positions in said opening whereby, when in one position said side walls form the runners of a sled and the wheels of said wheeled body lie suspended under the sled, and in the second position said side walls form the side walls of a wheeled vehicle.

3. In a convertible vehicle as set forth in claim 2, wherein said wheeled platform is provided with suitable notches correspondingly positioned in its side edges, and said side walls are provided with coordinated tenons extending from its edges and adapted to fit in said notches to secure the said parts together.

4. The combination with a wheeled platform, of a removable framed structure adapted to fit around said platform in either of two positions, said structure having side walls and end braces, said side walls being deeper than the wheeled platform and forming sled runners when inverted over the sides of the wheeled platform, and forming a wagon box when placed on top of said wheeled platform.

BENJAMIN G. GELLENBECK.

REFERENCES CITED

The following references are of record in the file of this patent:

UNITED STATES PATENTS

| Number | Name | Date |
|---|---|---|
| 1,075,336 | Custer | Oct. 14, 1913 |
| 1,312,444 | Jackson | Aug. 5, 1919 |
| 1,728,587 | Aldridge | Sept. 17, 1929 |
| 1,810,997 | Bauer | June 23, 1931 |